(12) United States Patent
Tanaka et al.

(10) Patent No.: US 12,159,734 B2
(45) Date of Patent: Dec. 3, 2024

(54) WIRING MEMBER

(71) Applicant: Sumitomo Wiring Systems, Ltd., Mie (JP)

(72) Inventors: Yoshiaki Tanaka, Mie (JP); Masaki Mizushita, Mie (JP); Jun Yamasaki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 161 days.

(21) Appl. No.: 17/908,421

(22) PCT Filed: Mar. 3, 2021

(86) PCT No.: PCT/JP2021/008126
§ 371 (c)(1),
(2) Date: Aug. 31, 2022

(87) PCT Pub. No.: WO2021/187102
PCT Pub. Date: Sep. 23, 2021

(65) Prior Publication Data
US 2023/0147609 A1 May 11, 2023

(30) Foreign Application Priority Data
Mar. 19, 2020 (JP) ................. 2020-048673

(51) Int. Cl.
*H01B 7/40* (2006.01)
*B60R 16/02* (2006.01)
*H01B 7/08* (2006.01)
*H02G 3/04* (2006.01)

(52) U.S. Cl.
CPC ........... *H01B 7/40* (2013.01); *B60R 16/0215* (2013.01); *H01B 7/0846* (2013.01); *H02G 3/04* (2013.01)

(58) Field of Classification Search
CPC ....... H01B 7/0823; H01B 7/0846; H01B 7/40
See application file for complete search history.

(56) References Cited

U.S. PATENT DOCUMENTS

2022/0051832 A1* 2/2022 Takakura ................ H01B 3/44
2022/0093288 A1* 3/2022 Fukushima .............. H02G 3/30

FOREIGN PATENT DOCUMENTS

JP 2019-207816 A 12/2019
WO 2019/021886 A1 1/2019

OTHER PUBLICATIONS

International Search Report International Pat. Appl. No. PCT/JP2021/008126, dated May 18, 2021, English translation.
(Continued)

*Primary Examiner* — Chau N Nguyen
(74) *Attorney, Agent, or Firm* — GREENBLUM & BERNSTEIN, P.L.C.

(57) ABSTRACT

A wiring member includes a sheet, a first wire-like transmission member fixed to the sheet, and a second wire-like transmission member having lower rigidity than the first wire-like transmission member and fixed to the sheet. An intersection part of the first wire-like transmission member and the second wire-like transmission member is provided on the sheet, and the first wire-like transmission member is located closer to a side of the sheet than the second wire-like transmission member in the intersection part.

4 Claims, 3 Drawing Sheets

(56) References Cited

OTHER PUBLICATIONS

International Preliminary Report on Patentability International Pat. Appl. No. PCT/JP2021/008126, dated Oct. 6, 2022, English translation.
Japan Office Action issued in JP Application No. 2020-048673, dated Jul. 25, 2023.

* cited by examiner

WIRING MEMBER

TECHNICAL FIELD

The present disclosure relates to a wiring member.

BACKGROUND ART

Patent Document 1 discloses a wiring member including a sheet material and a plurality of insulating wires disposed to have an intersection part on a main surface of the sheet material.

PRIOR ART DOCUMENTS

Patent Documents

Patent Document 1: Japanese Patent Application Laid-Open No. 2019-207816

SUMMARY

Problem to be Solved by the Invention

A wire-like transmission member is desired to be detached more hardly from a sheet in a wiring member having an intersection part on the sheet.

Accordingly, an object is to provide a technique of detaching a wire-like transmission member more hardly from a sheet in a wiring member having an intersection part on the sheet.

Means to Solve the Problem

A wiring member according to the present disclosure is a wiring member including: a sheet; a first wire-like transmission member fixed to the sheet; and at least one second wire-like transmission member having lower rigidity than the first wire-like transmission member and fixed to the sheet, wherein an intersection part of the first wire-like transmission member and the second wire-like transmission member is provided on the sheet, and the first wire-like transmission member is located closer to a side of the sheet than the second wire-like transmission member in the intersection part.

Effects of the Invention

According to the present disclosure, the wire-like transmission member is detached more hardly from the sheet in the wiring member having the intersection part on the sheet.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a sheet; a first wire-like transmission member fixed to the sheet; and at least one second wire-like transmission member having lower rigidity than the first wire-like transmission member and fixed to the sheet, wherein an intersection part of the first wire-like transmission member and the second wire-like transmission member is provided on the sheet, and the first wire-like transmission member is located closer to a side of the sheet than the second wire-like transmission member in the intersection part. The first wire-like transmission member having higher rigidity than the second wire-like transmission member is located on a side of the sheet in the intersection part. Thus, the first wire-like transmission member can be continuously fixed to the sheet in a section including the intersection part, or can be fixed to the sheet at a small fixation interval. Accordingly, the first wire-like transmission member is hardly detached from the sheet in the section including the intersection part.

(2) In the wiring member according to (1), it is also applicable that the first wire-like transmission member is any of a power source wire, a ground wire, a shield wire, and a multicore wire, and the second wire-like transmission member is a single-core signal wire. Accordingly, the first wire-like transmission member as any of the power source wire, the ground wire, the shield wire, and the multicore wire is hardly detached from the sheet.

(3) In the wiring member according to (1) or (2), the first wire-like transmission member may intersect with the plurality of second wire-like transmission members in a parallel route part where the plurality of second wire-like transmission members are parallelly arranged. Accordingly, the plurality of second wire-like transmission members suppress deviation of the first wire-like transmission member from the sheet.

(4) In the wiring member according to any one of (1) to (3), a covering layer of each of the first wire-like transmission member and the second wire-like transmission member may be fused to the sheet. Accordingly, the first wire-like transmission member and the plurality of second wire-like transmission members are simply fixed to the sheet.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
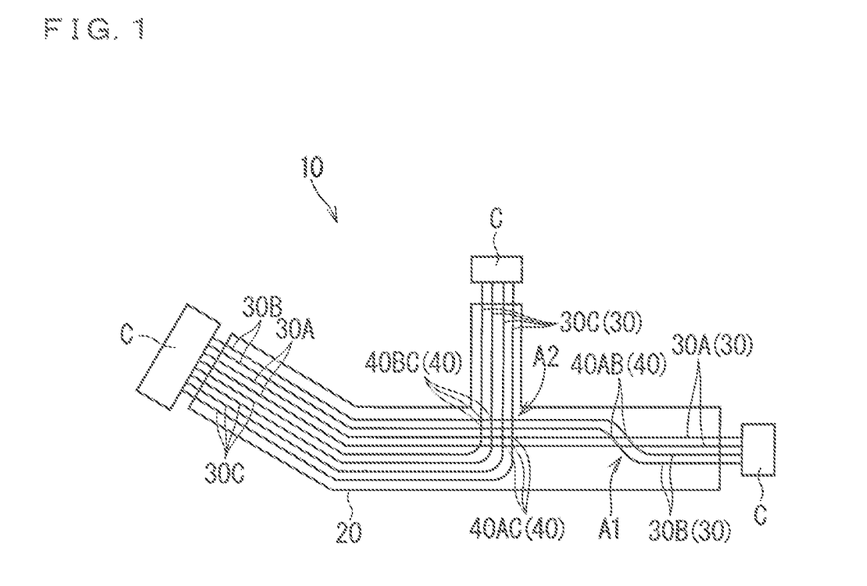
FIG. 1 is a schematic plan view illustrating a wiring member according to an embodiment 1.
Figure 2:
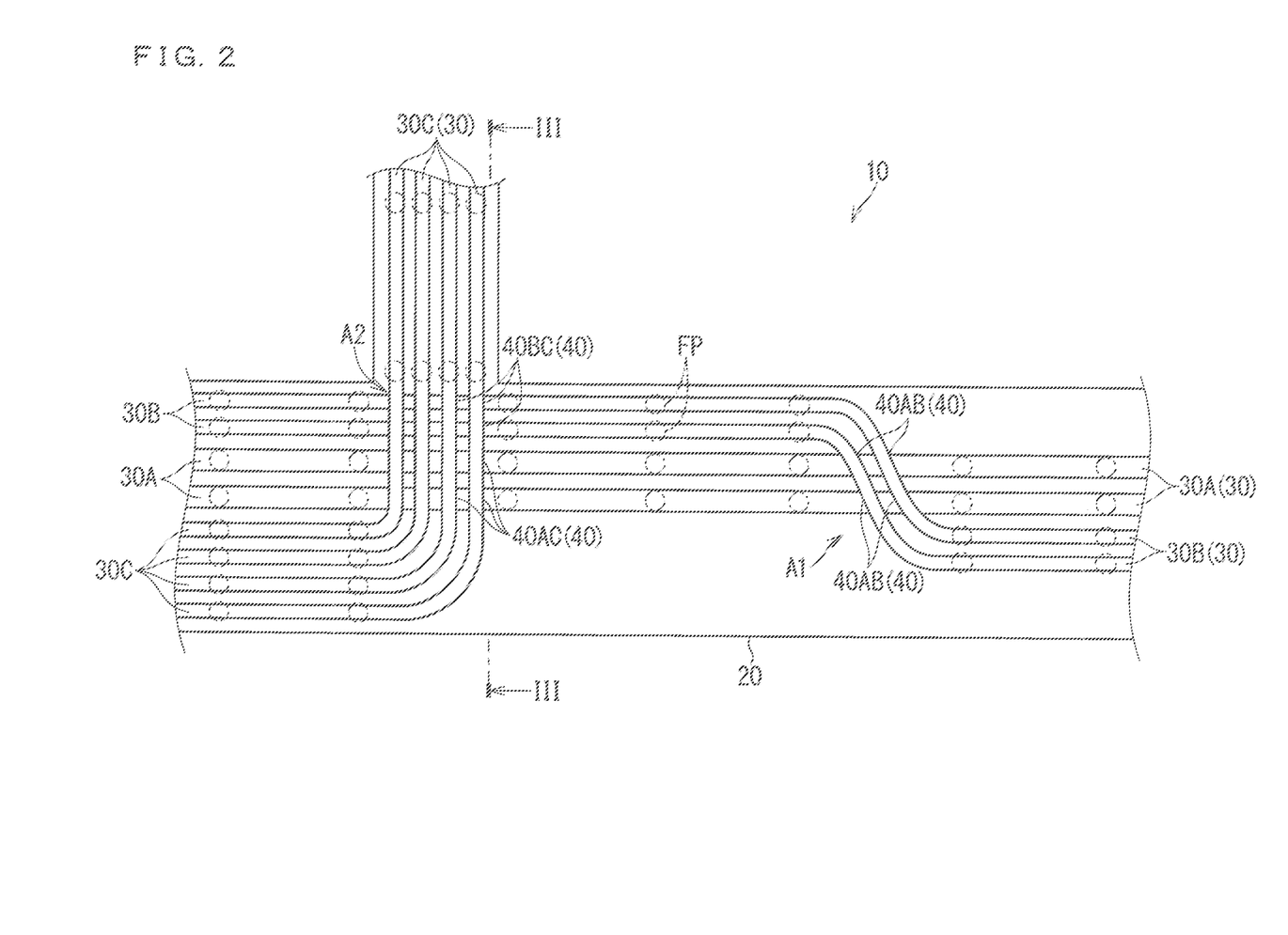
FIG. 2 is a partial enlarged view of FIG. 1.
Figure 3:
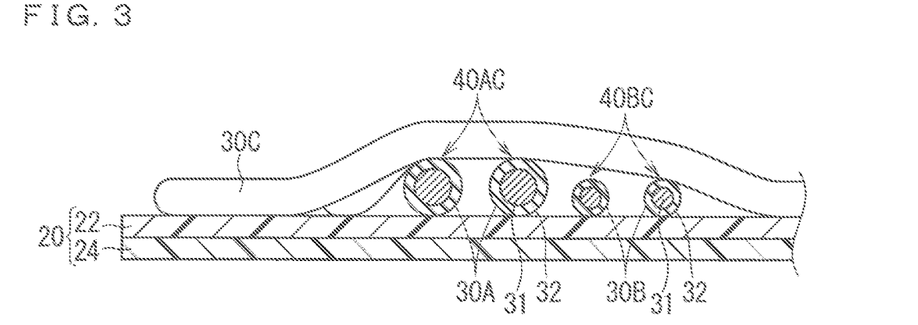
FIG. 3 is a cross-sectional view of the wiring member cut along a III-III line in FIG. 2.

A wiring member according to an embodiment 1 is described hereinafter. FIG. 1 is a schematic plan view illustrating a wiring member 10 according to the embodiment 1. FIG. 2 is a partial enlarged view of FIG. 1. FIG. 3 is a cross-sectional view of the wiring member cut along a III-III line in FIG. 2. A portion illustrated by a virtual line in FIG. 2 and FIG. 3 are fixing parts FP.

The wiring member 10 includes a sheet 20 and a plurality of wire-like transmission members 30. The plurality of wire-like transmission members 30 are fixed to the sheet 20. The sheet 20 is formed into a flat shape as a whole. The plurality of wire-like transmission members 30 are fixed to the sheet 20, thus the wiring member 10 is kept in a flat state.

The sheet 20 needs only fix the plurality of wire-like transmission members 30, thus a material and a structure, for example, are not particularly limited. With regard to a material constituting the sheet 20, the sheet 20 is formed of a resin material herein. A material other than resin such as metal or an inorganic material, for example, may be used for the material constituting the sheet 20. With regard to the structure of the sheet 20, the sheet 20 has a double layer structure herein. The structure of the sheet 20 may be a single layer structure, or a multilayer structure of three or more layers is also applicable.

The sheet 20 includes a first layer 22 and a second layer 24. The first layer 22 is a fusion layer. The wire-like transmission member 30 is fused and fixed to the fusion layer. The fusion layer includes a resin material, or preferably includes a thermoplastic resin material. The resin material of the fusion layer is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer is not particularly limited. For example, the fusion layer may be a sheet having an evenly filled cross-sectional surface (also referred to as a non-foam sheet or a solid sheet, for example). The fusion layer is also considered a foam sheet, for example. The fusion layer is also considered a fibrous material sheet such as a braided cloth, a woven cloth, or a non-woven cloth, for example. One surface of the first layer 22 is one main surface of the sheet 20.

The second layer 24 is formed of a material different from that of the fusion layer, or has a different structure. The second layer 24 increases a function of the fusion layer, or adds a function which the fusion layer does not have to the sheet 20. A material constituting the second layer 24 is a material described for the fusion layer described above, metal, or an inorganic material, for example. A structure of the second layer 24 may be any of the structure described for the fusion layer described above. One surface of the second layer 24 is the other main surface of the sheet 20.

The first layer 22 and the second layer 24 are fixed to each other while the other surface of the first layer 22 and the other surface of the second layer 24 have contact with each other. A fixing state of the first layer 22 and the second layer 24 is not particularly limited, however, fixing by fusion or adhesion is preferable. For example, when at least one of the first layer 22 and the second layer 24 is a sheet having voids in a surface such as a fibrous material sheet or a foam sheet, a resin material or an adhesive agent enters the voids and the layers can be fixed to each other. Such a configuration causes so-called anchor effect, thus the first layer 22 and the second layer 24 are rigidly fixed.

In the description herein, the first layer 22 is a solid sheet made of resin and the second layer 24 is a fibrous material sheet. In the description herein, the first layer 22 and the second layer 24 are fused to each other. That is to say, the resin of the first layer 22 enters between the fibers of the second layer 24 while having flowability, and is then hardened. Maintained accordingly is a state where the resin of the first layer 22 enters between the fibers of the second layer 24, and the first layer 22 and the second layer 24 are rigidly fixed to each other.

The first layer 22 and the second layer 24 are formed to have the same size (the same planar shape). One of the first layer 22 and the second layer 24 may also be formed to be larger than the other one thereof. The first layer 22 and the second layer 24 are wholly fixed at a region where they have contact with each other. The first layer 22 and the second layer 24 may also be fixed only at a part of a region where they have contact with each other.

The sheet 20 may be a flexible member. For example, the first layer 22 is a solid sheet made up of flexible resin such as flexible PVC as a material, the second layer 24 is a non-woven cloth made up of PET as a material, and the sheet 20 is a flexible member. For example, the sheet 20 may have a plastic property so as to be able to follow bending of the wire-like transmission member 30. It is also applicable that the wiring member 10 can be bended in a thickness direction (bending so that a fold line follows the main surface of the sheet 20).

The plurality of wire-like transmission members 30 are wire-like members transmitting electrical power or light, for example. The plurality of wire-like transmission members 30 are assumed to be members connecting components in a vehicle. A connector C, for example, is provided on an end portion of the wire-like transmission member 30. This connector C is connected to a connector provided in the other side component, thus the wire-like transmission member 30 is connected to the other side component. That is to say, the present wiring member 10 is used as the wiring member 10 electrically connecting various types of component in a vehicle, for example (or connecting them so that they can perform optical communication). The connector C may be fixed to the sheet 20.

Routes of the plurality of wire-like transmission members 30 are set in accordance with a position of a component to which the wire-like transmission members 30 are connected. The plurality of wire-like transmission members 30 are fixed to the sheet 20, thus the plurality of wire-like transmission members 30 are kept in a form following a wiring route corresponding to a position of a component as a connection destination of each wire-like transmission member 30. The route of the plurality of wire-like transmission members 30 may be made up of a combination of a straight route and a bending route. The sheet 20 may also be made up of a combination of a straight route and a bending route. The plurality of wire-like transmission members 30 may be fixed to the sheet 20 in a state where a branch wire is branched from a main wire. The sheet 20 may also be formed into a shape in which a portion to which the branch wire is fixed is branched from a portion to which the main wire is fixed. Herein, the plurality of wire-like transmission members 30 are bended on the sheet 20. The plurality of wire-like transmission members 30 are branched on the sheet 20.

The wire-like transmission member 30 includes a transmission wire body 31 and a covering layer 32. The transmission wire body 31 is a portion transmitting electrical power or light. When the wire-like transmission member 30 is an electrical wire, the transmission wire body 31 is a conductor core wire. The conductor core wire is made up of one or a plurality of strands. The strand is formed of copper, copper alloy, aluminum, or aluminum alloy as a material, for example. When the wire-like transmission member 30 is an optical fiber, the transmission wire body 33 is a core and a clad. The covering layer 32 is a layer covering the transmission wire body 31. A resin material constituting the covering layer 32 is not particularly limited, but can be appropriately set. For example, the wire-like transmission member 30 may be a general wire having a core wire and a covering layer around the core wire, or may also be a shield wire, a twisted wire, an enamel wire, a nichrome wire, or an optical fiber.

The wire-like transmission member 30 transmitting the electrical power may be various kinds of signal wires or various kinds of power wires. Some of the wire-like transmission members 30 transmitting the electrical power may be used as an antenna or coil, for example, transmitting or receiving a signal or electrical power to or from a space.

The wire-like transmission member 30 may be a single core wire. The single core wire is a single wire-like object. The single core wire is the wire-like transmission member 30 with one transmission route. The wire-like transmission member 30 may be a multicore wire. The multicore wire is a compound body of a plurality of wire-like objects. The single core wire is the wire-like transmission member 30 with a plurality of transmission routes. The multicore wire may be a cable made up of collected twisted wires or a plurality of wire-like objects covered by a sheath 36, for example.

Herein, the wire-like transmission member 30 is fused and fixed to the sheet 20. In this case, an outermost layer of the wire-like transmission member 30 and a fusion layer are fused to each other. An outermost layer of the wire-like transmission member 30 is a covering layer 32. The covering layer 32 is made up of a material which can be fused to the fusion layer. A resin material constituting the covering layer 32 and a resin material constituting the fusion layer are the same type of material. A resin material constituting the fusion layer and a resin material constituting the covering layer 32 are PVC or polyolefin, for example. However, a fixing state of the wire-like transmission member 30 and the sheet 20 is not limited to fusion. The fixing state other than fusion is described in detail in modification examples described hereinafter.

The plurality of fixing parts FP where the sheet 20 and the wire-like transmission member 30 are fixed are provided at intervals along the extension direction of the wire-like transmission member 30. The interval between the fixing parts FP is not particularly limited, but can be appropriately set. However, the fixing parts FP where the sheet 20 and the wire-like transmission member 30 are fixed may be continuously provided along the direction in which the wire-like transmission member 30 extends.

Herein, eight wire-like transmission members 30 are included. The eight wire-like transmission members 30 are divided into two wire-like transmission members 30A, two wire-like transmission members 30B, and four wire-like transmission members 30C. The two wire-like transmission members 30A intersect with the two wire-like transmission members 30B, respectively, in a first intersection region A1. The two wire-like transmission members 30A and the two wire-like transmission members 30B intersect with the four wire-like transmission members 30C, respectively, in a second intersection region A2. The first intersection region A1 and the second intersection region A2 are provided in positions away from each other along the extension direction of the wire-like transmission member 30A. Only one of the first intersection region A1 and the second intersection region A2 may be provided.

In the present specification, a portion where two wire-like transmission members 30 intersect with each other on the sheet 20 is referred to as an intersection part 40. A portion where two wire-like transmission members 30A and 30B intersect with each other is referred to as an intersection part 40AB hereinafter. A portion where two wire-like transmission members 30A and 30C intersect with each other is referred to as an intersection part 40AC. A portion where two wire-like transmission members 30B and 30C intersect with each other is referred to as an intersection part 40BC.

The plurality of wire-like transmission members 30 include two or more types of wire-like transmission member having rigidity different from each other. In a combination of two wire-like transmission members having different rigidity, a wire-like transmission member having higher rigidity is referred to as a first wire-like transmission member and a wire-like transmission member having lower rigidity is referred to as a second wire-like transmission member. A degree of rigidity of the two wire-like transmission members 30 may be obtained by an amount of bending of a test piece with a predetermined length supported in a predetermined posture at a time of applying predetermined load to a predetermined position in the test piece, for example.

The rigidity of the wire-like transmission member 30 is determined by a compositive combination of a plurality of conditions such as a layer structure of the wire-like transmission member 30, a material and structure of the transmission wire body 31, and a material and structure of the covering layer 32, for example.

For example, it is assumed that two wire-like transmission members 30 of a single-core general wire and a single-core shield wire have the same condition except for a layer structure. In this case, rigidity of the single-core shield wire tends to be generally higher than that of the single-core general wire. The single-core general wire is an electrical wire made up of one conductor core wire and one covering layer. The single-core shield wire is an electrical wire in which a shield layer and a second covering layer are further provided on a single-core general wire.

For example, it is assumed that two wire-like transmission members 30 of a single-core general wire and a multicore wire have the same condition except for the number of cores. That is to say, the multicore wire is a compound body of a plurality of single-core general wires. In this case, rigidity of the multicore wire tends to be generally higher than that of the single-core general wire.

For example, it is assumed that two wire-like transmission members 30 having different conductor cross-sectional area have the same condition except for the conductor cross-sectional area. In this case, rigidity of the wire-like transmission member 30 having a larger conductor cross-sectional area tends to be generally higher than that of the wire-like transmission member 30 having a smaller conductor cross-sectional area. Herein, when each of a power source wire, a ground wire, and a signal wire are made up of a single-core general wire, the power source wire and the ground wire tend to have a larger conductor cross-sectional area than the signal wire. Thus, the power source wire and the ground wire tend to have higher rigidity than the signal wire. The reason is that the power source wire and the ground wire are used for a circuit for supplying electrical power to an actuator, for example, in some cases, and such a circuit needs to have a large conductor cross-sectional area so that large current can flow therein.

For example, it is assumed that two wire-like transmission members 30 of a copper electrical wire in which a material of the transmission wire body 31 is copper and an aluminum electrical wire in which a material of the transmission wire body 31 is aluminum have the same condition except for the material of the transmission wire body 31. In this case, rigidity of the aluminum electrical wire tends to be generally higher than that of the copper electrical wire.

For example, it is assumed that two wire-like transmission members 30 having substantially the same conductor cross-sectional area and having a different number of strands have the same condition except for the number of strands of the transmission wire body 31. In this case, rigidity of the wire-like transmission member 30 having a smaller number of strands tends to be generally higher than that of the wire-like transmission member 30 having a larger number of strands.

One of the two wire-like transmission members 30 constituting one intersection part 40 located on a side of the sheet 20 is referred to as a lower side wire-like transmission member, and the other one of the two wire-like transmission members 30 is referred to as an upper side wire-like transmission member in some cases. Focusing on rigidity of the lower side wire-like transmission member and the upper side wire-like transmission member constituting the intersection part 40, the intersection part 40 is divided into three intersection parts of a first intersection part, a second intersection part, and a third intersection part. The first intersection part is an intersection part in which the lower side wire-like transmission member has higher rigidity than the upper side wire-like transmission member. The second intersection part is an intersection part in which the upper side wire-like transmission member has higher rigidity than the lower side wire-like transmission member. The third intersection part is an intersection part in which the lower side wire-like transmission member has the same rigidity as the upper side wire-like transmission member.

In the example illustrated in FIG. 2, four intersection parts 40 in the first intersection region A1 are all intersection parts 40AB. In the first intersection region A1, the wire-like transmission members 30A and 30B intersect with each other to change an order of arrangement. The wire-like transmission members 30A and 30B are parallel to each other in both sides of the first intersection region A1.

The wire-like transmission member 30A has higher rigidity than the wire-like transmission member 30B. Accordingly, the wire-like transmission member 30A is the first wire-like transmission member and the wire-like transmission member 30B is the second wire-like transmission member in a combination of the wire-like transmission members 30A and 30B. The wire-like transmission member 30A is the lower side wire-like transmission member located on a side of the sheet 20 and the wire-like transmission member 30B is the upper side wire-like transmission member in the intersection part 40AB. Accordingly, all of the intersection parts 40AB are the first intersection parts.

The wire-like transmission member 30A extends straight in a section including the intersection part 40AB. The wire-like transmission member 30B extends to be curved in a section including the intersection part 40AB. A route of the wire-like transmission member 30A is longer than that of the wire-like transmission member 30B in a section including the intersection part 40AB in the parallel route part. In this manner, it is sufficient that the route of the second wire-like transmission member is disposed to be longer than that of the first wire-like transmission member in a section including the intersection part 40 in which the two wire-like transmission members 30 changes their order of arrangement.

In the example illustrated in FIG. 2, eight intersection parts 40 in sixteen intersection parts 40 in the second intersection region A2 are the intersection parts 40AC and eight intersection parts 40 are the intersection parts 40BC. In the second intersection region A2, the wire-like transmission members 30A, 30B, and 30C intersect with each other to be branched. The wire-like transmission members 30A, 30B, and 30C are parallel to each other in one side of the second intersection region A2. The wire-like transmission members 30A and 30B and the wire-like transmission member 30C extend in different directions in the other side of the second intersection region A2. The wire-like transmission members 30A and 30B and the wire-like transmission member 30C may also extend in different directions in the other side of the second intersection region A2.

The wire-like transmission member 30A has higher rigidity than the wire-like transmission member 30C. Accordingly, the wire-like transmission member 30A is the first wire-like transmission member and the wire-like transmission member 30C is the second wire-like transmission member in a combination of the wire-like transmission members 30A and 30C. The wire-like transmission member 30A is the lower side wire-like transmission member located on a side of the sheet 20 and the wire-like transmission member 30C is the upper side wire-like transmission member in the intersection part 40AC. Accordingly, all of the intersection parts 40AC are the first intersection parts.

The wire-like transmission member 30B has the same rigidity as the wire-like transmission member 30C. Thus, there is no first wire-like transmission member and the second wire-like transmission member in the combination of the wire-like transmission members 30B and 30C. All of the intersection parts 40BC are the third intersection parts. The wire-like transmission member 30B is the lower side wire-like transmission member located on a side of the sheet 20 and the wire-like transmission member 30C is the upper side wire-like transmission member in the intersection part 40BC.

In the example illustrated in FIG. 2, all of the plurality of intersection parts 40AB and 40AC set in one wire-like transmission member 30A are the first intersection parts. Some of the plurality of intersection parts 40AB and 40BC set in one wire-like transmission member 30B are the first intersection parts and the other some of the intersection parts 40BC are the third intersection parts. In the similar manner, some intersection parts 40AC in the plurality of intersection parts 40AC and 40BC set in one wire-like transmission member 30C are the first intersection parts, and the other some intersection parts 40BC are the third intersection parts. In this manner, the plurality of intersection parts in one wire-like transmission member 30 may include some of the first intersection parts, the second intersection parts, and the third intersection parts.

When the wire-like transmission member 30 constituting the first intersection part constitutes the second intersection part or the third intersection part in the other intersection part 40 in the same intersection region, it is sufficient that the wire-like transmission member 30 as the upper side wire-like transmission member in the first intersection part is the upper side wire-like transmission member also in the second intersection part or the third intersection part. For example, the wire-like transmission member 30C constituting the first intersection part in the intersection part 40AC constitutes the third intersection part in the other intersection part 40BC in the same intersection region. The wire-like transmission member 30C is the upper side wire-like transmission member in the intersection parts 40 of any of the intersection parts 40AC and 40BC. In the similar manner, when the wire-like transmission member 30 constituting the first intersection part constitutes the second intersection part or the third intersection part in the other intersection part 40 in the same intersection region, it is sufficient that the wire-like transmission member 30 as the lower side wire-like transmission member in the first intersection part is the lower side wire-like transmission member also in the second intersection part or the third intersection part.

It is also applicable that the first wire-like transmission member is any of a power source wire, a ground wire, a shield wire, and a multicore wire, and the second wire-like transmission member is a single-core signal wire. Herein, one of the two wire-like transmission members 30A is a power source wire, and the other one thereof is a ground wire. The power source wire and the ground wire are wires supplying electrical power to an apparatus. The power source wire is an electrical wire on a plus side. The ground wire is an electrical wire on a minus side. When a body earth, for example, is adopted, the ground wire may be omitted. The remaining wire-like transmission members 30B and 30C are all single core signal wires.

As illustrated in FIG. 2, the plurality of second wire-like transmission members are provided. The plurality of second wire-like transmission members are parallelly arranged in the parallel route part. The first wire-like transmission member intersects with the plurality of second wire-like transmission members in the parallel route part. The plurality of second wire-like transmission members press the first wire-like transmission member. Specifically, four wire-like transmission members 30C are parallelly arranged in the second intersection region A2. Each of two wire-like transmission members 30A intersects with the four wire-like transmission members 30C. Each of the two wire-like transmission members 30A is pressed by the four wire-like transmission members 30C.

Effect Etc. Of Embodiment 1

According to the wiring member 10 having the above configuration, the wire-like transmission member 30A having higher rigidity than the wire-like transmission members 30B and 30C is located on the side of the sheet 20 in the intersection parts 40AB and 40AC. Thus, the wire-like transmission member 30A can be continuously fixed to the sheet 20 in a section including the intersection parts 40AB and 40AC, or can be fixed to the sheet 20 at a small fixation interval. Accordingly, the wire-like transmission member 30A is detached more hardly from the sheet 20 in the section including the intersection parts 40AB and 40AC. Herein, the wire-like transmission member 30A as a power source wire or a ground wire is detached more hardly from the sheet 20.

The wire-like transmission member 30A having high rigidity hardly follows bending of the sheet 20 compared with the wire-like transmission members 30B and 30C having low rigidity when the sheet 20 is bended, for example, thus is easily detached from the sheet 20. A portion detached from the sheet 20 and cannot be fixed to the sheet 20 occurs in a section including the intersection part 40 in the upper side wire-like transmission member in the two wire-like transmission members 30 having the intersection part 40. In contrast, the lower side wire-like transmission member can have contact with the sheet 20 in the section including the intersection part 40, and can be fixed thereto. Thus, when the wire-like transmission member 30A having high rigidity is applied to the lower side wire-like transmission member, the wire-like transmission member 30A can have contact with the sheet 20 in the section including the intersection parts 40AB and 40AC, and can be fixed thereto, thus is hardly detached from the sheet 20.

The wire-like transmission member 30A intersects with the plurality of wire-like transmission members 30C in the parallel route part, thus the plurality of wire-like transmission members 30C suppresses deviation of the wire-like transmission member 30A from the sheet 20.

The covering layer 32 of each of the wire-like transmission members 30 are fused to the sheet 20, thus the wire-like transmission member 30 is simply fixed to the sheet 20.

Modification Example

Figure 4:
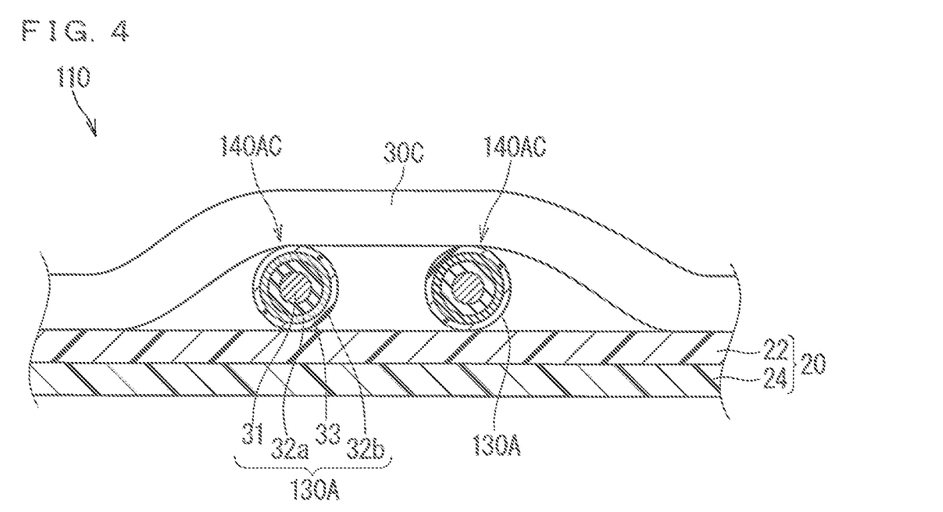
FIG. 4 is a cross-sectional view illustrating a modification example of the wiring member.

FIG. 4 is a cross-sectional view illustrating a modification example of the wiring member 10. In the wiring member 110 illustrated in FIG. 4, the wire-like transmission member 130A is a shield wire. The wire-like transmission member 130A includes the transmission wire body 31, a first covering layer 32a, a shield layer 33, and the second covering layer 32b. The transmission wire body 31, the first covering layer 32a, the shield layer 33, and the second covering layer 32b are stacked in this order from an inner side to an outer side. A configuration similar to the transmission wire body 31 and the covering layer 32 in the wiring member 10 can be adopted to the transmission wire body 31 and the first covering layer 32a. The shield layer 33 is not particularly limited. For example, the shield layer 33 may be a conductor foil. The conductor foil may be spirally wound or vertically attached. For example, the shield layer 33 may be a braided wire. The braided wire may be formed into a cylindrical shape. The second covering layer 32b is an outermost layer of the wire-like transmission member 130A. When the second covering layer 32b is fused to the fusion layer, the second covering layer 32b is preferably a material which can be fused to the fusion layer.

The wire-like transmission member 130A has higher rigidity than the wire-like transmission member 30C. Accordingly, the wire-like transmission member 130A is the first wire-like transmission member and the wire-like transmission member 30C is the second wire-like transmission member in a combination of the wire-like transmission members 130A and 30C. The wire-like transmission member 130A is the lower side wire-like transmission member and the wire-like transmission member 30C is the upper side wire-like transmission member in the intersection part 140AC of the wire-like transmission member 130A and the wire-like transmission member 30C. Accordingly, the intersection part 140AC is the first intersection part. Also in this case, the wire-like transmission member 130A as a shield wire is hardly detached from the sheet 20.

Figure 5:
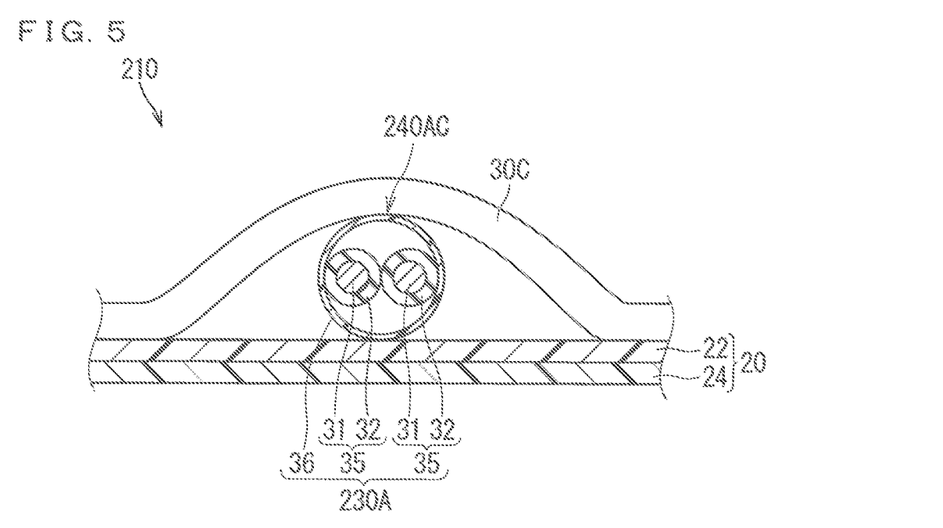
FIG. 5 is a cross-sectional view illustrating another modification example of the wiring member.

FIG. 5 is a cross-sectional view illustrating another modification example of the wiring member 10. In the wiring member 210 illustrated in FIG. 5, the wire-like transmission member 230A is a multicore wire. The wire-like transmission member 230A illustrated in FIG. 5 includes two transmission routes. The wire-like transmission member may be a multicore wire having three or more transmission routes. The wire-like transmission member 230A includes two covering electrical wires 35. The two covering electrical wire 35 is covered by the sheath 36. Accordingly, the wire-like transmission member 230A is a multicore wire with the sheath 36.

The wire-like transmission member 230A has higher rigidity than the wire-like transmission member 30C. Accordingly, the wire-like transmission member 230A is the first wire-like transmission member and the wire-like transmission member 30C is the second wire-like transmission member in a combination of the wire-like transmission members 230A and 30C. The wire-like transmission member 230A is the lower side wire-like transmission member and the wire-like transmission member 30C is the upper side wire-like transmission member in the intersection part 240AC between the wire-like transmission member 230A and the wire-like transmission member 30C. Accordingly, the intersection part 240AC is the first intersection part. Also in this case, the wire-like transmission member 230A as a multicore wire is hardly detached from the sheet 20.

In the above description, the wire-like transmission member 30 on the sheet 20 is the first wire-like transmission member or the second wire-like transmission member, however, this configuration is not necessary. For example, the third wire-like transmission member which does not intersect with the other wire-like transmission member 30 may be provided on the sheet 20. The third wire-like transmission member may extend along the same route as the first wire-like transmission member or the second wire-like transmission member on the sheet 20. The third wire-like transmission member may extend along a route different from the first wire-like transmission member or the second wire-like transmission member on the sheet 20.

Described in the above description is the example that the wiring members 10, 110, and 210 do not include the second intersection part, however, this configuration is not necessary. The wiring member may include the second intersection part. When the plurality of intersection parts 40 are located on the sheet 20, it is sufficient that at least one intersection part 40 is the first intersection part.

In the example described in the embodiment 1, one wire-like transmission member 30 intersects with a different wire-like transmission member 30 at a plurality of positions. That is to say, the plurality of intersection parts 40 are set in one wire-like transmission member 30. However, only one intersection part may be set in one wire-like transmission member.

Described in the embodiment 1 is the example that the wire-like transmission member 30A intersects with the plurality of wire-like transmission member 30C in the parallel route part, however, this configuration is not necessary. The wire-like transmission member 30A may intersect with one wire-like transmission member 30.

In the example described in the embodiment 1, two types of the wire-like transmission member 30 having different rigidity are provided, however, there may be also a case where three or more types of wire-like transmission member 30 having different rigidity are provided in one wiring member 10. For example, considered is a case where provided are three type of wire-like transmission member, that is, a wire-like transmission member having high rigidity, a wire-like transmission member having middle rigidity, and a wire-like transmission member having low rigidity in descending order of the rigidity. In this case, the wire-like transmission member having high rigidity is the first wire-like transmission member and the wire-like transmission member having middle rigidity is the second wire-like transmission member in a combination of the wire-like transmission member having high rigidity and the wire-like transmission member having middle rigidity. The wire-like transmission member having high rigidity is the first wire-like transmission member and the wire-like transmission member having low rigidity is the second wire-like transmission member in a combination of the wire-like transmission member having high rigidity and the wire-like transmission member having low rigidity. The wire-like transmission member having middle rigidity is the first wire-like transmission member and the wire-like transmission member having low rigidity is the second wire-like transmission member in a combination of the wire-like transmission member having middle rigidity and the wire-like transmission member having low rigidity. In this manner, the wire-like transmission member having middle rigidity may be the first wire-like transmission member or the second wire-like transmission member depending on the other side member in combination. In this manner, the plurality of intersection parts in the wire-like transmission member having middle rigidity may include the first intersection part and the second intersection part.

When three or more types of the wire-like transmission member having different rigidity are provided in one wiring member, the wire-like transmission member having highest rigidity in the wire-like transmission member constituting the intersection part may be a lower side electrical wire part in all of the plurality of intersection parts constituting the wire-like transmission member. The wire-like transmission member having lowest rigidity in the wire-like transmission member constituting the intersection part may be an upper side electrical wire part in all of the plurality of intersection parts constituting the wire-like transmission member.

As described above, applicable as the fixing state of the sheet 20 and the wire-like transmission member 30 is fusion fixation, or a fixing state other than the fusion fixation is also applicable. Applicable as the fixing state of the sheet 20 and the wire-like transmission member 30 are a contact area fixation and a non-contact area fixation, or both fixations may be used together. Herein, the contact area fixation indicates that a portion where the sheet 20 and the wire-like transmission member 30 have contact with each other is stuck and fixed. The non-contact area fixation is a fixing state which is not the contact area fixation, and indicates that a sewing thread, a cover, or an adhesive tape presses the wire-like transmission member 30 toward the sheet 20 or sandwiches the sheet 20 and the wire-like transmission member 30 to keep them in a fixing state.

Applicable as the configuration of the contact area fixation are a contact area indirect fixation and a contact area direct fixation, or both fixations may also be used together in different regions. Herein, the contact area indirect fixation indicates that the sheet 20 and the wire-like transmission member 30 are indirectly stuck and fixed via an adhesive agent, a gluing agent, and a double-sided adhesive tape provided therebetween. The contact area direct fixation indicates that the sheet 20 and the wire-like transmission member 30 are directly stuck and fixed without an intervention of the adhesive agent, for example, which is separately provided. Considered in the contact area direct fixation is that resin included in at least one of the sheet 20 and the wire-like transmission member 30 is melted, thus the sheet 20 and the wire-like transmission member 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as fusion can be used. For example, when the contact area direct fixation by heat is formed by fusion, adoptable are various types of fusion means such as ultrasonic fusion, heating pressurizing fusion, hot air fusion, and high-frequency fusion. When the state of the contact area direct fixation is formed by these means, the sheet 20 and the wire-like transmission member 30 are in the state of the contact area direct fixation by these means. Specifically, when the state of the contact area direct fixation is formed by the ultrasonic fusion, for example, the sheet 20 and the wire-like transmission member 30 are in the state of the contact area direct fixation by the ultrasonic fusion. Accordingly, the fusion fixation described above is one aspect of the contact area direct fixation.

The configurations described in the embodiments and modification examples thereof can be appropriately combined as long as they are not contradictory.

EXPLANATION OF REFERENCE SIGNS 10, 110, 210 wiring member
20 sheet
22 first layer
24 second layer
30 wire-like transmission member
30A, 130A, 230A wire-like transmission member (first wire-like transmission member)
30B, 30C wire-like transmission member (second wire-like transmission member)
31 transmission wire body
32, 32a, 32b covering layer
33 shield layer
35 covering electrical wire
36 sheath
40, 40AB, 40AC, 40BC intersection part
A1 first intersection region
A2 second intersection region
C connector
FP fixing part

The invention claimed is:

1. A wiring member, comprising:
a sheet;
a first wire-like transmission member fixed to the sheet; and
at least one second wire-like transmission member having lower rigidity than the first wire-like transmission member and fixed to the sheet, wherein
an intersection part of the first wire-like transmission member and the at least one second wire-like transmission member is provided on the sheet, wherein each of the first wire-like transmission member and the at least one second wire-like transmission member is not fixed to the sheet at the intersection part,
the first wire-like transmission member is located closer to a side of the sheet than the at least one second wire-like transmission member in the intersection part,
a plurality of first fixing parts where the first wire-like transmission member and the sheet are fixed are provided at intervals along a direction in which the first wire-like transmission member extends,
a plurality of second fixing parts where the at least one second wire-like transmission member and the sheet are fixed are provided at intervals along a direction in which the at least one second wire-like transmission member extends, and
a route of the at least one second wire-like transmission member between two of the second fixing parts sandwiching the intersection part is longer than a route of the first wire-like transmission member between two of the first fixing parts sandwiching the intersection part.

2. The wiring member according to claim 1, wherein
the first wire-like transmission member is any of a power source wire, a ground wire, a shield wire, and a multicore wire, and the at least one second wire-like transmission member includes a single-core signal wire.

3. The wiring member according claim 1, wherein
a covering layer of each of the first wire-like transmission member and the at least one second wire-like transmission member is fused to the sheet.

4. A wiring member, comprising:
a sheet;
a first wire-like transmission member fixed to the sheet; and
a plurality of second wire-like transmission members having lower rigidity than the first wire-like transmission member and fixed to the sheet, wherein
an intersection part of the first wire-like transmission member and the plurality of second wire-like transmission members is provided on the sheet,
the first wire-like transmission member is located closer to a side of the sheet than the plurality of second wire-like transmission members in the intersection part,
a plurality of first fixing parts where the first wire-like transmission member and the sheet are fixed are provided at intervals along a direction in which the first wire-like transmission member extends,
a plurality of second fixing parts where the plurality of second wire-like transmission members and the sheet are fixed are provided at intervals along a direction in which the plurality of second wire-like transmission members extend,
a route of the plurality of second wire-like transmission members between two of the second fixing parts sandwiching the intersection part is longer than a route of the first wire-like transmission member between two of the first fixing parts sandwiching the intersection part, and
wherein
the first wire-like transmission member intersects with the plurality of second wire-like transmission members in a parallel route part where the plurality of second wire-like transmission members are parallelly arranged.

* * * * *